Sept. 23, 1969  F. DAVIES  3,468,147
PIPE-FITTING TOOLS
Filed Oct. 16, 1967

FRED DAVIES, INVENTOR
By Wenderoth, Lind & Ponack,
Atty's 3,468,147
Patented Sept. 23, 1969

3,468,147
PIPE-FITTING TOOLS
Fred Davies, 72 Maxwell Ave., Orange,
New South Wales, Australia
Filed Oct. 16, 1967, Ser. No. 675,494
Claims priority, application Australia, Oct. 18, 1966,
12,699/66
Int. Cl. B21d 19/08, 39/04
U.S. Cl. 72—112
9 Claims

ABSTRACT OF THE DISCLOSURE

The disclosure provides a tool for outwardly deforming a hole in a metal tube to provide an annular flange on the tube, around the hole, so as to provide a greater area for securing a branch pipe to the tube than is provided merely by drilling a hole in the tube.

---

This invention relates to improvements in pipe-fitting tools and in particular to tools for preparing a length of pipe for the insertion of a branch pipe intermediately of its ends. As will be seen as the description proceeds, it is of particular use on thin-walled pipes such as copper, bronze or aluminum piping where screw-threaded sockets and other screwed fittings are not normally used.

The object of the invention is to provide a ready means whereby a branch pipe may simply and conveniently be inserted in and secured to another pipe of the same or a larger diameter.

According to a general form of the invention, there is provided a pipe-fitting tool including a former for insertion through a hole formed in the wall of a pipe, said former being of two sections adapted to be combined to form a part-spherical or conical surface inside said pipe and around the periphery of said hole, means to rotate said former and means simultaneously to draw said part-spherical or conical surface outwardly against the periphery of said hole to form an annular flange projecting externally of said pipe.

But a better understanding of the invention may be obtained from the following description of one exemplary form thereof when this is read with reference to the accompanying drawings, of which:

Figure 1:
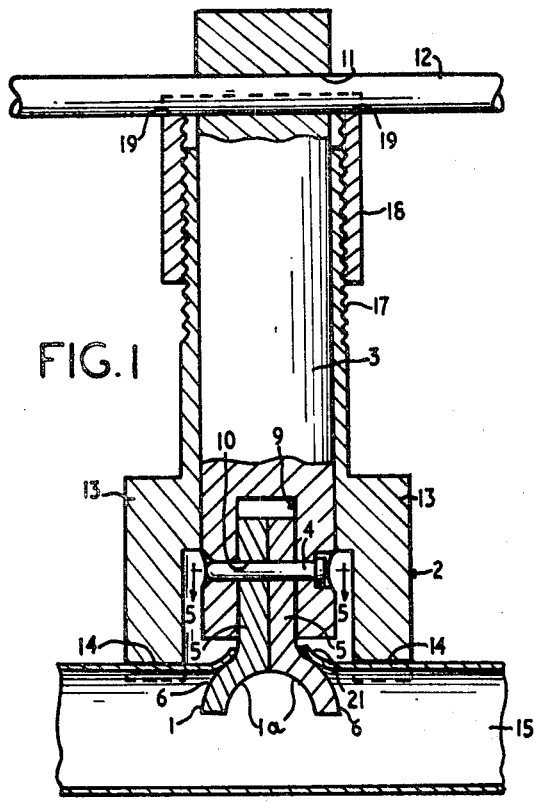
FIGURE 1 is a vertical section of the tool in engagement with a pipe which is shown in longitudinal section.
Figure 2:
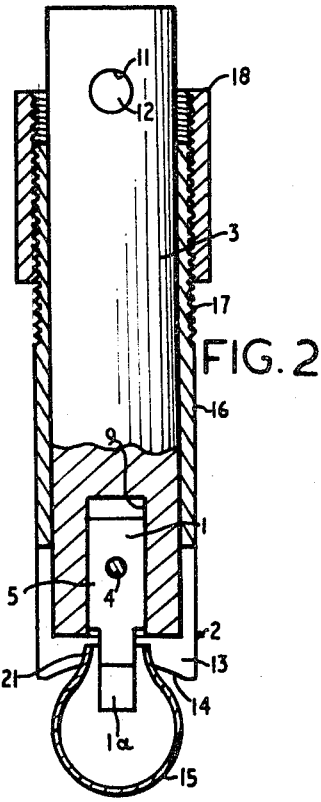
FIGURE 2 is a vertical section taken at right angles to FIGURE 1.

In its preferred form, the invention comprises a pipe-fitting tool which includes a former 1 consisting of a mating pair of substantially identical former sections 1a or 1b, a saddle jack 2, a former holder 3 and a locking pin 4 for locking the former holder 3 to the former 1.

Figure 3:
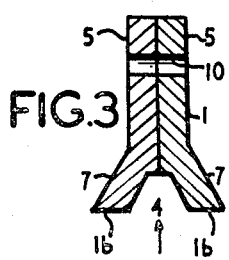
FIGURE 3 is a section of an alternative former to that shown in FIGURE 1.
Figure 4:
FIGURE 4 is a bottom plan view on the arrow 4 of FIGURE 3.
Figure 5:
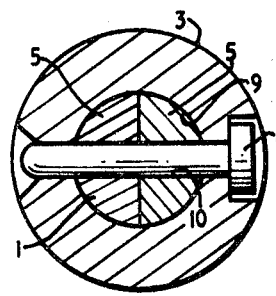
FIGURE 5 is a section on the line 5—5 of FIGURE 1.
Figure 6:
FIGURES 6 and 7 are views similar to FIGURE 5, but showing modifications thereof.
Figure 6:
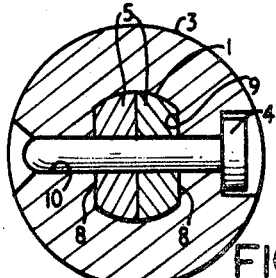

Each former section 1a or 1b consists of a semi-circular sectioned rod 5 the lower end of which extends angularly outwards from the lower end of the semi-circle of the rod and has its upper surface formed in either a part-spherical shape as at 6 (FIGURE 1) or a conical shape as at 7 (FIGURE 3). At the upper end of ecah former section 1a or 1b, the semi-circular surface may be flattened parallel with the flat side of the rod as at 8 (FIGURE 6) so that when the flat sides of the two rods 5 are brought together a non-circular shank is provided. This is not essential, however, and the combined rods 5 may be left cylindrical as in FIGURES 5 and 7.

The former holder 3 is a solid cylindrical member having a recess 9 at one end of the same shape as the shank on the former 1 and into which recess 9 the shank snugly fits. The shank and former holder 3 have a passage 10 formed diametrically therethrough to receive the locking pin 4.

Towards the other end (or upper end when in use) of the former holder 3 a further passage 11 is formed diametrically therethrough to receive a removable tommy bar 12 for rotating the former 1 and the former holder 3.

The saddle jack 2 is a hollow member which is bifurcated as at 13 on one diameter thereof and on the other diameter at right angles thereto is provided with arcuate recesses 14 so that the saddle jack 2 will rest snugly on the exterior of a pipe 15 with the bifurcations 13 straddling a hole formed in the wall of the pipe.

The end 16 of the saddle jack opposite to the bifurcations 13 is cylindrical and has an external screw thread 17 formed thereon. Engageable and rotatable on this screw thread 17 is an internally threaded hollow collar 18 and in the end of the collar 18 remote from the saddle jack 2 are formed two diametrically-opposite arcuate recesses 19 in which the tommy bar 12 may be engaged.

In using the tool, a hole or holes of the size required to take the branch pipe 20 (FIGURE 9) after the annular flange or rim 21 has been formed, is or are drilled in the wall of the pipe 15 and the part-spherical or conical angular end 1a or 1b of the former rods 5 are inserted separately through the hole or holes into the inside of the pipe 15. The half rods are then brought with their flat surfaces into contact and engaged in the recess 9 in the former holder 3, where they are locked by sliding the locking pin 4 through the aligned portions of the passage 10.

The saddle jack 2 is then passed over the former holder 3 and former 1 so that its semi-circular recesses 14 engage the wall of the pipe 15 and rest thereon.

The recesses 19 at the end of the collar 18 are aligned with the tommy bar passage 11 in the former holder 3 by rotating the collar 18 and the tommy bar 12 is passed therethrough.

If the tommy bar 12 is now rotated in a counterclockwise direction, the former 1, former holder 3 and collar 18 will also be rotated, and the collar 18 moving on the thread 17 on the saddle jack 2 will draw the part-spherical or conical surfaces of the former 1 against the interior of the pipe 15 adjacent the hole or holes therein and will draw the wall of the pipe 15 outwards to form an annular flange 21 and increase the size of the hole or holes to such size as is required to enable the branch 20 of the required size to be inserted therein and be secured as by silver soldering in the known way.

Although drill sizes and former dimensions form no part of the invention, it will be appreciated by those skilled in the art that as different sizes of holes will be necessary to adapt the invention to different sizes of pipe 15 and/or branches 20, and as the former 1 requires to be passed in two sections through hole or holes in the wall of the pipe 15, different sizes of formers 1 will be required for different circumstances. These will, however, be obvious to those skilled in the art.

Figure 7:
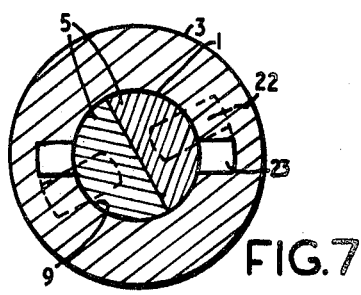

Although the rods 5 of the former 1 may be secured in the recess 9 by means of the locking pin 4 as previously described, this is not essential, and as shown in FIGURE 7, each rod section 5 may have a stub pin 22 secured therein to engage in an inverted L-shaped "bayonet" slot 23, which may be formed in the wall of the recess 9 or may extend to the outer periphery of the former holder 3. The offset arm or limb of the slot 23 will extend in the opposite direction to that of rotation of the former holder 3 and collar 18 so that the pins 22 are pressed into the end of the limb.

In this regard, it will be appreciated that the thread 17, which is a fine thread of low pitch, may be either a right-hand or a left-hand thread and that the counter-clockwise rotation of the former holder 3 presupposes a right-hand thread. The essential here is that upon rotation of the collar 18 and former holder 3 by the tommy bar 12, the collar 18 will move outwardly away from the saddle jack 2 and thus draw the formers 1a or 1b outwardly from the interior of the pipe 15.

Figure 8:
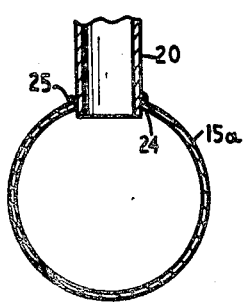
FIGURE 8 shows a pipe branch made in accordance with prior art.
Figure 9:
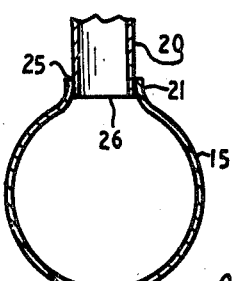
FIGURE 9 shows a branch made by the tool of the present invention.

The advantages of the present invention are clearly shown in FIGURES 8 and 9 where, in FIGURE 8, a branch 20 is shown as being secured in a pipe 15a by a previously known method, where the branch 20 is pressed into a hole 24 and secured as by brazing or soldering 25. By this method, a secure joint can only be obtained by allowing the branch 20 to project within the pipe 15a, thus causing some restriction in the flow therethrough. The extent of the joint so made is limited and the connection is thus undesirably weak.

As shown in FIGURE 9, however, where the annular flange or rim 21 permits the end 26 of the pipe 20 to remain within the flange 21 and still provides a much deeper zone of contact for the brazing or soldering 25.

Although the branch 20 will normally be formed of copper or other metal, this is not essential, as the invention is of particular effect in the insertion of plastic tubing such as, for instance P.V.C. tubing, as branch lines. In such cases, the method shown in FIGURE 8 would be unsatisfactory, as insufficient contact area is available to ensure a good and strong adhesive joint. By use of the present invention, however, as shown in FIGURE 9, ample contact area is provided to ensure a firm and reliable joint when one of the known acrylic adhesives is used.

What I claim is:

1. A pipe-fitting tool comprising a former for insertion through a hole formed in the wall of a pipe, said former having two sections adapted to be combined to form a part-spherical surface inside said pipe around the periphery of said hole, means to rotate said former and means simultaneously to draw said part-spherical surface outwardly against the periphery of said hole to form an annular flange projecting externally of said pipe.

2. A tool according to claim 1, wherein said means to rotate said former and said means to draw said part-spherical surface outwardly against the periphery of the hole in the wall of the pipe include a bifurcated saddle jack adapted non-rotatably to rest on said pipe above said hole, said saddle jack having a projecting tubular portion having an external screw thread formed thereon, a collar in screw-threaded engagement with said external screw thread, a former holder extending through said tubular portion to a point between the bifurcations and having a recess therein for receiving and locking in said recess portions of each of said former sections, and means for locking said former holder and said collar together for simultaneous rotation relative to said saddle jack, whereby said rotation in one direction causes said collar to move away from said pipe and simultaneously to rotate said former holder and former and to draw said former outwardly of said pipe through the hole therein.

3. A tool according to claim 2, wherein said two former sections each has a rod portion projecting therefrom, said rod portions being adapted to combine into a unitary projection for reception in the recess in said former holder.

4. A tool according to claim 3, wherein said unitary projection is cylindrical.

5. A tool according to claim 3, wherein said unitary projection is non-cylindrical.

6. A tool according to claim 5, wherein said unitary projection is a cylinder having a flat portion formed on diametrically opposite chords thereof.

7. A tool according to claim 2, wherein said former is secured in said recess by a locking pin extending through cooperating passages in said former and said former holder.

8. A tool according to claim 2, wherein each said former rod portion has a pin secured therein and said former is locked in said recess by said pins engaging in L-shaped bayonet-fitting slots formed in the wall of said recess.

9. A tool according to claim 2, wherein the means for locking said former holder and collar together for simultaneous rotation include a passage formed diametrically through said former holder above said threaded portion, diametrically opposite recesses formed in the adjacent end of said collar and a tommy bar for insertion through said passage and in engagement with said opposite recesses when said collar is rotated to bring the recesses and passage into mutual alignment, said tommy bar being then operable to cause said simultaneous rotation.

References Cited

UNITED STATES PATENTS

| | | | |
|---|---|---|---|
| 2,292,799 | 8/1942 | Romann | 29—157 |
| 2,507,859 | 5/1950 | Keller | 72—370 |
| 2,511,836 | 6/1950 | Cullen | 29—157 |

CHARLES L. LANHAM, Primary Examiner

G. P. CROSBY, Assistant Examiner

U.S. Cl. X.R.

29—157; 72—370, 478